(12) United States Patent
Nakajima (10) Patent No.: US 7,791,795 B2
(45) Date of Patent: Sep. 7, 2010

(54) MICROSCOPE WITH A FOCUSING ASSIST APPARATUS

(75) Inventor: Yasuharu Nakajima, Yokohama (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 12/289,451

(22) Filed: Oct. 28, 2008

(65) Prior Publication Data

US 2009/0080069 A1    Mar. 26, 2009

Related U.S. Application Data

(63) Continuation of application No. PCT/JP2007/060363, filed on May 21, 2007.

(30) Foreign Application Priority Data

Jun. 9, 2006    (JP) .............................. 2006-160548

(51) Int. Cl.
*G02B 21/00*    (2006.01)
(52) U.S. Cl. ....................... 359/381; 359/384; 359/388; 396/107

(58) Field of Classification Search ....................... None
See application file for complete search history.

(56) References Cited

FOREIGN PATENT DOCUMENTS

| GB | 2 076 176 A | 11/1981 |
|---|---|---|
| JP | A-9-127421 | 5/1997 |
| JP | A-2004-151607 | 5/2004 |
| JP | A-2006-23624 | 1/2006 |

*Primary Examiner*—Stephone B Allen
*Assistant Examiner*—Derek S Chapel
(74) *Attorney, Agent, or Firm*—Oliff & Berridge, PLC (57) ABSTRACT

A microscope for focusing by inserting a split prism at a focusing support time. The image of an iris stop is branched into such two images by the angle deflecting action of the split prism as are individually shifted and focused at symmetric positions across the optical axis of the microscope. These two branched images of the iris stop are further focused on an objective lens through a beam splitter by the focusing action of a lens. The operation unit of a vertical motion device is operated to move an optical system up and down so that the images of a focused pattern are viewed to move in opposite directions from each other in the field of view.

4 Claims, 7 Drawing Sheets

FIG. 1

RELATED ART

MICROSCOPE WITH A FOCUSING ASSIST APPARATUS

TECHNICAL FIELD

The present invention relates to a microscope provided with a focusing assist apparatus which assists an operator to bring an object surface of an object into focus trough visual check during microscope observation.

BACKGROUND ART

Generally, in visually observing an image of an object surface of an object with a microscope (for example, in the case where an image of an object surface formed on a focal plate by an objective lens is observed through an eyepiece), when the object surface exists within a focal depth of the objective lens, the image of the object surface formed on the focal plate appears in focus even if a relative positional relationship between the object surface and the objective lens is changed within the focal depth range in an optical axis direction of the objective lens. Therefore, in the case where a size and a shape are to be accurately measured in a certain object surface of the object, and where a size in a height direction of the object, for example, a distance between two object surfaces deviated in the optical axis direction of the objective lens, is to be accurately measured, a focusing apparatus is particularly required to adjust the relative positional relationship to match a focal position of the objective lens accurately with each object surface.

Figure 1:
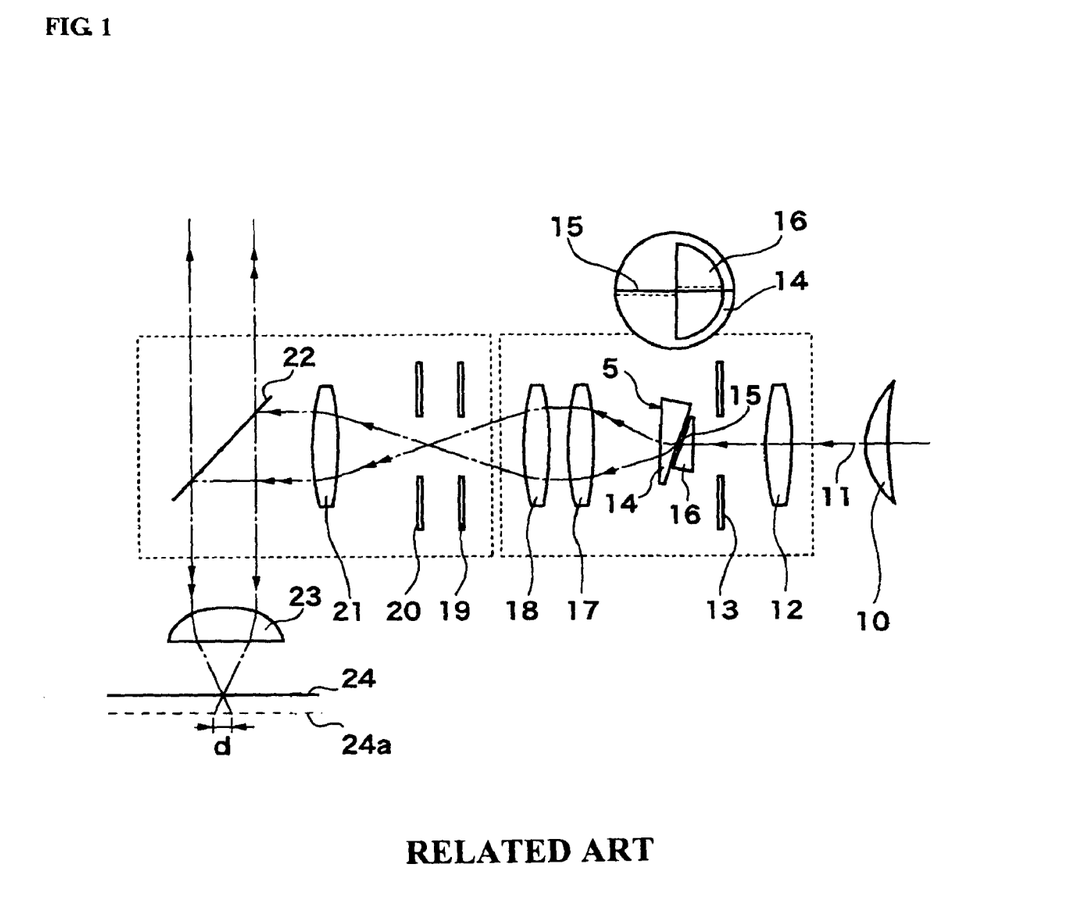
FIG. 1 is a view showing a configuration of a conventional focusing operation assist apparatus.

As a patent document prior to the captioned application, UK Patent No. GB2076176A (Patent Document 1), for instance, discloses a microscope provided with a focusing apparatus. FIG. 1 is a view showing a schematic configuration of a microscope equipped with a conventional focusing operation assist apparatus disclosed in Patent Document 1. A lens 12 is disposed such that a collector lens 10 and a split prism 5 are conjugate with each other. The split prism 5 includes a base prism 14 having a predetermined apex angle and a semicircular prism 16 having an apex angle which is twice as large as that of the base prism. A focused pattern 15 is formed on the light source side of the base prism 14. The focused pattern includes at least one line, and the focused pattern straddles two regions to which different deflection angles are respectively imparted by the base prism 14 and the semicircular prism 16.

The light emitted from the light source is incident to the split prism 5 while the luminous flux is restricted to an optimum condition for focusing assist, by an aperture diaphragm 13. An image of the aperture diaphragm 13 is formed on a diameter-variable microscope aperture diaphragm 19 through lenses 17 and 18. However, the image of the aperture diaphragm 13 is branched into two images by a deflection angle action of the split prism 5, and the two images are formed while deviated from each other in a symmetrical manner in relation to the optical axis of the focusing apparatus.

The two branched images of the aperture diaphragm 13 are formed on an objective lens 23 (strictly, on a pupil of objective lens 23) through a beam splitter 22 by image forming action of a lens 21.

The focusing assist apparatus is placed on a stage of a vertical motion device (not shown), an operation unit of the vertical motion device is operated to move the whole of the optical system in the optical axis direction so as to adjust a relative positional relationship between the objective lens 23 and an object surface 24 in the optical axis direction. The optical system is disposed such that it is observed within a visual field that the focused pattern images move in opposite directions when the operation unit of the vertical motion device is operated to move up and down the optical system, and such that the focused pattern images are observed to be matched with each other when a focal position of the objective lens 23 is matched with a specimen surface 24. In a non-focused state (for example, the state in which the specimen surface is located at a position indicated by numeral 24a of FIG. 1), the focused pattern images are observed while deviated from each other, and two lines of the focused pattern are projected away from each other by d on the specimen surface 24a.

The aperture diaphragm 13 and the split prism 5 are placed so as to be inserted into and retracted from an optical path by an inserting and retracting mechanism (not shown). During a period of the focusing assist, the split prism 5 and the aperture diaphragm 13 are inserted into the optical path to match the focused patterns, thereby establishing the focusing. During a period of observation, the aperture diaphragm 13 and the split prism 5 are retracted from the optical path, so that the focusing assist apparatus acts as a usual microscope epi-illuminating device.

Patent Document 1: UK Patent No. GB2076176A

In the focusing assist apparatus disclosed in Patent Document 1, using the lenses 17 and 18, the aperture diaphragm 13 is disposed at a position which is conjugate with the microscope aperture diaphragm 19 while the focused pattern 15 is disposed at a position which is conjugate with the microscope field stop 20. The aperture diaphragm 13 and the focused pattern 15 are projected to the objective lens pupil plane and the specimen surface 24 after intermediate images formed, respectively. Therefore, the optical components 12 to 18 can be modularized and can be added to usual microscopes. At the same time, the apparatus configuration becomes complicated, which leads to higher costs and a larger size.

In view of the foregoing, a problem of the present invention is to provide a simple and compact microscope provided with a focusing assist apparatus in which focusing can accurately be performed with no restriction of magnification or NA of the objective lens.

DISCLOSURE OF THE INVENTION

In accordance with a first aspect of the invention which seeks to solve the problem, a microscope provided with a focusing assist apparatus, includes a light source; a first lens group; a diameter-variable diaphragm which is disposed at a position which is conjugate with the light source while the first lens group is interposed therebetween; an optical path branching member which is illuminated with a luminous flux restricted by the diameter-variable diaphragm, the optical path branching member having a focusing indicator and forming two luminous fluxes, the luminous fluxes being inclined by predetermined angles from an optical axis; a second lens group; and an objective lens, wherein the diameter-variable diaphragm is disposed at a position a position which is conjugate with a pupil of the objective lens while the second lens group is interposed therebetween, the focusing indicator of the optical path branching member is disposed at a position a position which is conjugate with the observed surface by the second lens group and the objective lens, and the optical path branching member can be inserted into and retracted from a microscope optical path.

In regard to the first aspect, in the configuration disclosed in Patent Document 1, the optical path branching member and the focusing indicator thereof are disposed at a position where the microscope field stop 20 is placed, and the optical path branching member can be inserted into and retracted from the microscope optical path. Accordingly, in the microscope according to the aspect of the invention, because the focusing indicator is directly projected onto the observed surface without intermediate image formation, the microscope can be made simple and compact compared with the conventional microscope.

According to a second aspect of the invention which seeks to solve the problem, in the microscope in the first aspect of the invention, a diameter φ of the diameter-variable diaphragm can be set at a predetermined value suitable to focusing assist when the optical path branching member is inserted into the microscope optical path.

In the second aspect, the aperture diaphragm used to optimize lighting condition in the conventional technique is omitted, and the diameter-variable diaphragm (iris diaphragm) is used as the aperture of the microscope, which enables optimization of the luminous flux during a period of the focusing assist. Therefore, a simple and compact configuration is realized, and a diameter φ of the diameter-variable diaphragm can be set at a predetermined value suitable to the focusing assist as specifically described later, so that the focusing can be accurately performed with no restriction of magnification or NA of the objective lens.

According to a third aspect of the present invention, in the microscope of the second aspect of the invention, the setting suitable to the focusing assist is satisfying simultaneously the following conditional expressions (1) and (2).

$$\beta_1 a \geq \phi_M \tag{1}$$

$$2L\tan\left(\varepsilon - \tan^{-1}\frac{\phi_0}{2L\beta_2}\right) < \phi < 2L\tan\left(\varepsilon + \tan^{-1}\frac{\phi_0}{2L\beta_2}\right) \tag{2}$$

where $\beta_1$ is magnification of an image formed at a position of the diameter-variable diaphragm by the light source through the first lens group, a is a size of the light source, $\phi_M$ is a maximum diameter of the diameter-variable diaphragm, $\varepsilon$ is an inclination of a luminous flux given by the optical path branching member, L is a distance between the diameter-variable diaphragm and the focusing indicator, $\phi_0$ is a pupil diameter of the objective lens, and $\beta_2$ is magnification of an image of the diameter-variable diaphragm formed at a position of a pupil of the objective lens through the second lens group.

In the third aspect, as described later, a phenomenon in which illumination light hardly reaches the object surface due to an excessively small diameter φ of the diameter-variable diaphragm will not occur, and a case in which the focusing assist apparatus fails to fulfill the function due to an excessively large diameter φ of the diameter-variable diaphragm will never take place. Therefore, the setting suitable to the focusing assist can be realized.

According to a fourth aspect of the present invention for solving the problem, in the microscope of the second aspect of the invention, the setting suitable to the focusing assist is satisfying simultaneously the following conditional expressions (3), (4), and (5).

$$\beta_1 a < \phi_M \tag{3}$$

$$\beta_1 a < \phi \leq \phi_M \tag{4}$$

$$2L\tan\left(\varepsilon - \tan^{-1}\frac{\phi_0}{2L\beta_2}\right) < \beta_1 a < 2L\tan\left(\varepsilon + \tan^{-1}\frac{\phi_0}{2L\beta_2}\right) \tag{5}$$

where $\beta_1$ is magnification of an image formed at a position of the diameter-variable diaphragm by the light source through the first lens group, a is a size of the light source, $\phi_M$ is a maximum diameter of the diameter-variable diaphragm, $\varepsilon$ is an inclination of a luminous flux given by the optical path branching member, L is a distance between the diameter-variable diaphragm and the focusing indicator, $\phi_0$ is a pupil diameter of the objective lens, and $\beta_2$ is magnification of an image of the diameter-variable diaphragm formed at a position of a pupil of the objective lens through the second lens group.

In the fourth aspect, as described later, a phenomenon in which the illumination light hardly reaches the object surface due to an excessively large inclination $\varepsilon$ of the luminous flux will not occur, and a case in which the focusing assist apparatus fails to fulfill the function due to an excessively small inclination $\varepsilon$ of the luminous flux will never take place. Therefore, the setting suitable to the focusing assist can be realized.

According to a fifth aspect of the present invention for solving the problem, in the microscope of the third aspect of the invention, the following conditional expression (6) is satisfied.

[Formula 3]

$$\phi = 2L\tan\varepsilon \tag{6}$$

In the fifth aspect, as described later, even if one of objective lenses which have different pupil diameters is used by a switching operation, good focusing assist can always be performed irrespective of a pupil diameter of the objective lens.

According to a sixth aspect of the invention for solving the problem, in the microscope of the fourth aspect of the invention, the following conditional expression (7) is satisfied.

[Formula 4]

$$\beta_1 a = 2L\tan\varepsilon \tag{7}$$

In the sixth aspect, as described later, even if one of objective lenses which have different pupil diameters is used by a switching operation, good focusing assist can always be performed irrespective of a pupil diameter of the objective lens.

Thus, the invention can provide a simple and compact microscope provided with a focusing assist apparatus in which focusing can accurately be performed with no restriction of magnification or NA of the objective lens.

BRIEF DESCRIPTION OF THE DRAWINGS

FIGS. 3(a)-3(e) are views showing luminous fluxes on an objective lens pupil in the first embodiment of the invention.

FIGS. 4(a)-4(e) are views showing luminous fluxes on the objective lens pupil in the first embodiment of the invention.

FIGS. 6(a)-6(c) are views showing luminous fluxes on an objective lens pupil in a second embodiment of the invention.

FIGS. 7(a)-7(c) are views showing luminous fluxes on the objective lens pupil in the second embodiment of the invention.

EXPLANATIONS OF REFERENCE NUMERALS

1: light source
1a and 1b: light source image on objective lens pupil
5: split prism
10: collector lens
12, 17, 18, and 21: lens
13: aperture diaphragm
14: base prism
15: focused pattern
16: semicircular prism
19: microscope aperture diaphragm
20: microscope field stop
22: beam splitter
23: objective lens
24: specimen surface
24a: specimen surface
30: iris diaphragm
30a and 30b: iris diaphragm image on objective lens pupil
31: second objective lens
32: deflection prism

BEST MODE FOR CARRYING OUT THE INVENTION

Figure 2:
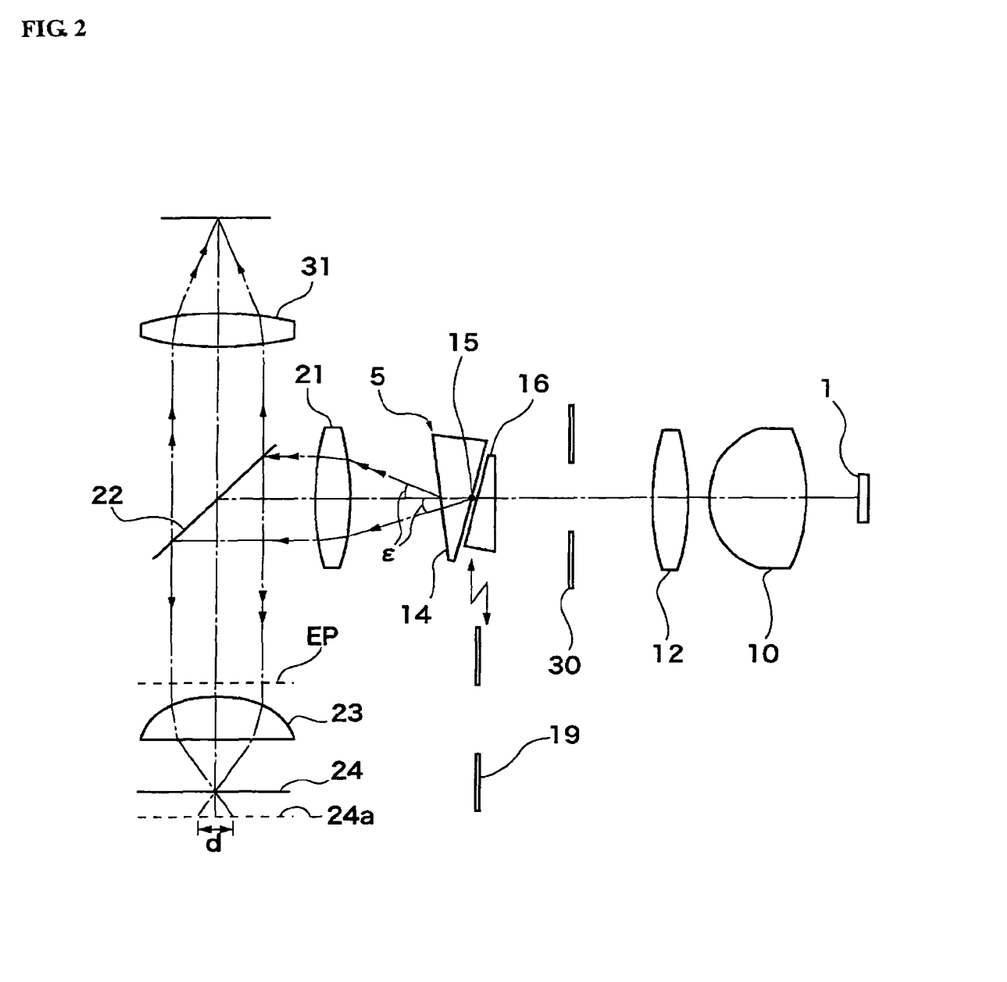
FIG. 2 is a view showing a configuration of a focusing assist apparatus according to a first embodiment of the invention.

A microscope provided with a focusing apparatus according to a first embodiment of the invention will be described below with reference to FIG. 2. Light emitted from a light source 1 is collected to a position of an iris diaphragm 30 through a collector lens 10 and a lens 12, and an image of the light source 1 is formed with magnification $\beta_1$. A split prism 5 includes a base prism 14 having a predetermined apex angle and a semicircular prism 16 having an apex angle which is twice as large as that of the base prism. A focused pattern 15 is formed on the light source side of the base prism 14. The focused pattern includes at least one line, and the focused pattern straddles two regions to which different deflection angles are respectively imparted by the base prism 14 and the semicircular prism 16. The split prism 5 is placed so as to be inserted into and retracted from an optical path of the focusing assist apparatus by an inserting and retracting mechanism (not shown).

In observing a specimen, the split prism 5 is retracted from the optical path of the focusing assist apparatus, so that the focusing assist apparatus functions as an ordinary microscope epi-illuminating device. When the split prism 5 is retracted from the optical path, a field stop 19 shall preferably be inserted into the optical path in place of the split prism 5 in order to restrict the excessive luminous flux of the lighting.

A diameter of the iris diaphragm 30 can be freely set within in a restriction of mechanism, and the diameter of the iris diaphragm 30 is used to control a coherence factor of the illumination light. The coherence factor is increased and decreased by adjusting the diameter of the iris diaphragm 30, which allows an observer to freely set a lighting condition according to an observation target.

On the other hand, during a period of the focusing assist, the split prism 5 is inserted to perform focusing. The light emitted from the light source is incident to the split prism 5 while the luminous flux is restricted by the iris diaphragm 30. An image of the iris diaphragm 30 is formed on a pupil EP of an objective lens 23 through a beam splitter 22 by image forming action of a lens 21. However, the image of the iris diaphragm 30 is branched into two by deflection angle action of the split prism 5, and the images are formed while deviated from each other in a symmetrical manner in relation to the optical axis of the focusing assist apparatus. The two branched images of the iris diaphragm 30 are formed on the objective lens 23 (strictly, on a pupil of objective lens 23) through the beam splitter 22 by the image forming action of the lens 21.

The focusing assist apparatus is placed on a stage of a vertical motion device (not shown), an operation unit of the vertical motion device is operated to move the whole of the optical system in the optical axis direction so as to adjust a relative positional relationship between the objective lens 23 and an object surface 24 in the optical axis direction. The optical system is disposed such that it is observed within a visual field that the images of the focused pattern 15 move in opposite directions when the operation unit of the vertical motion device is operated to move up and down the optical system, and such that the images of the focused pattern 15 are observed to be matched with each other when a focal position of the objective lens 23 is matched with the specimen surface 24. In a non-focused state (for example, the state in which the specimen surface is located at the numeral 24a of FIG. 2), the images of the focused pattern 15 are observed to be deviated from each other, and two lines of the focused pattern 15 are projected away from each other by d on the specimen surface 24a.

An optimum setting during a period of the focusing assist will be described with reference to FIGS. 3(a)-3(e) and 4(a)-4(e). FIGS. 3(a)-3(e) and 4(a)-4(e) show broadening of luminous fluxes on the objective lens pupil plane EP. FIGS. 3(a)-3(e) show the case in which the expression (1) is satisfied. In FIGS. 3(a)-3(e), the maximum diameter of the iris diaphragm 30 is smaller than the image of the light source 1 formed at the position of the iris diaphragm 30, and the object can be illuminated using part of an area of the light source 1 when the iris diaphragm 30 is opened. The image of the iris diaphragm 30 is branched into two by the deflection angle action of the split prism 5, and images 30a and 30b of the iris diaphragm 30 are formed on the objective lens pupil plane EP.

Figure 3:
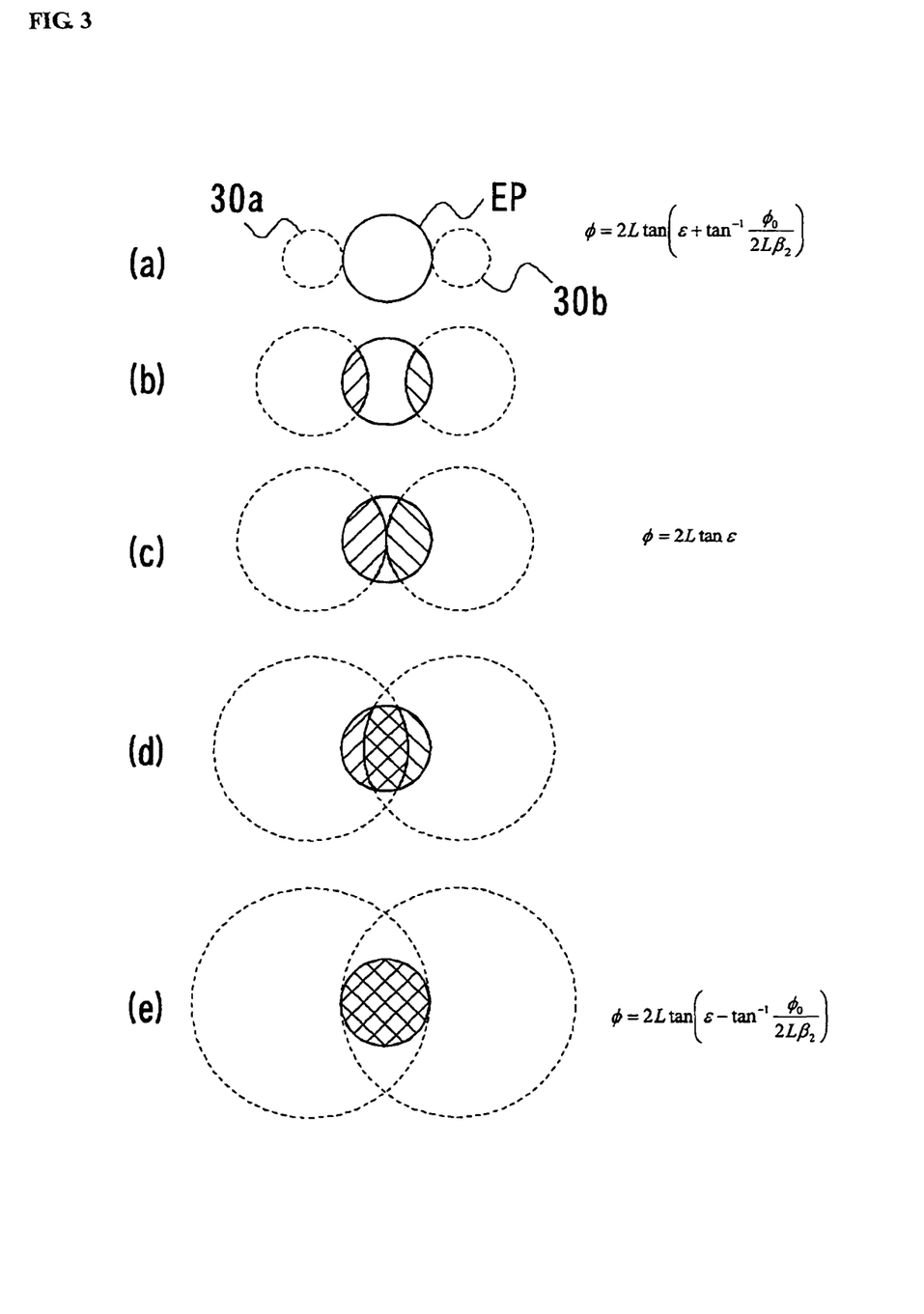

FIGS. 3(a) to 3(e) show states in which sizes of the images 30a and 30b are changed by adjusting the diameter of the iris diaphragm 30. In the case where the iris diaphragm 30 has an excessively small diaphragm diameter as shown in FIG. 3(a), an illumination luminous flux is not incident to the objective lens pupil, and an illumination light hardly reaches the object surface. On the other hand, in the case where the iris diaphragm 30 has an excessively large diaphragm diameter as shown in FIG. 3(e), because the luminous flux is projected onto the specimen surface 24 with no inclination, movement of the image of the reference pattern 15 according to the vertical motion of the focusing assist apparatus is prevented, and the focusing assist apparatus becomes incapable of fulfilling its function. Therefore, during a period of the focusing assist, it is necessary that the diameter of the iris diaphragm 30 be adjusted as shown in FIGS. 3(b) to 3(d). In such cases, the conditional range is expressed by the expression (2). In order to satisfy the condition mentioned above, the iris diaphragm 30 is used as an aperture of the microscope and the luminous fluxes are optimized while observing the objective lens pupil during a period of the focusing assist.

For adjustment of the iris diaphragm 30, a size of each unit, magnification, and a deflection angle of the split prism 5 should preferably be designed such that the condition is satisfied when the iris diaphragm 30 is set at the maximum diaphragm diameter. The design should preferably be performed such that the condition is satisfied only by opening the iris diaphragm 30 during a period of the focusing assist.

In a more preferable mode of the invention, the inserting and retracting mechanism (not shown) which inserts and retracts the split prism 5 is operated to forcedly set the diameter of the iris diaphragm 30 within a range where the condition is satisfied when the split prism 5 is inserted.

FIGS. 4(a)-4(e) show the case in which the expression (3) is satisfied. FIGS. 4(a)-4(e), the maximum diameter of the iris diaphragm 30 is larger than the image of the light source 1 formed at the position of the iris diaphragm 30, and the object is illuminated using the whole area of the light source 1 when the iris diaphragm 30 is opened. The image of the opening diaphragm 30 is branched into two images by the deflection angle action of the split prism 5, and the two images 30a and 30b of the iris diaphragm 30 are formed on the objective lens pupil plane EP. Similarly, images 1a and 1b of the light source 1 are formed on the objective lens pupil plane EP.

Figure 4:
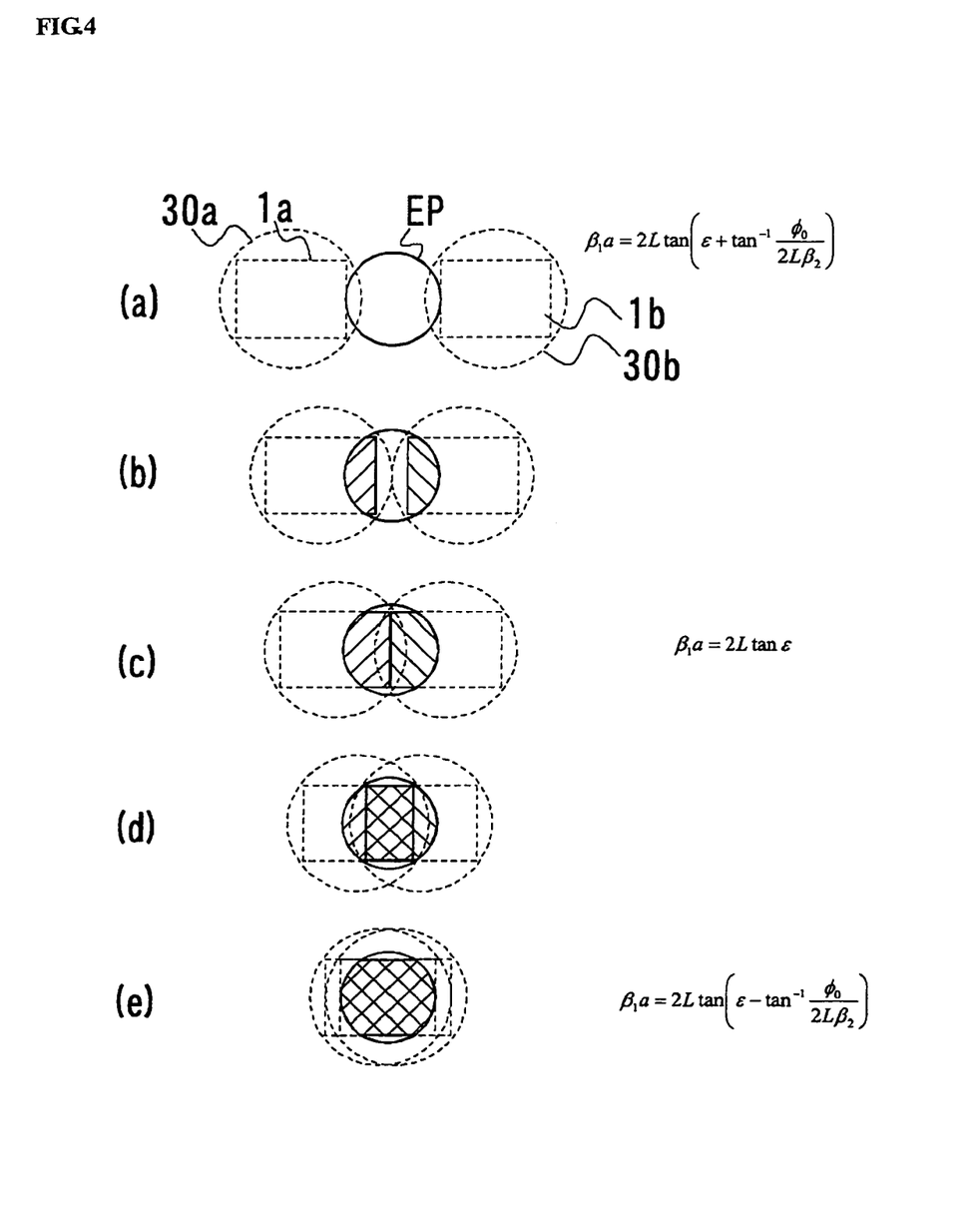

FIGS. 4(a) to 4(d) show states in which the images 30a and 30b and 1a and 1b are changed according to a deflection angle ε of the split prism 5. In the case where the split prism 5 has an excessively large deflection angle ε as shown in FIG. 4(a), an illumination luminous flux is not incident to the objective lens pupil, and an illumination light hardly reaches the object surface. On the other hand, in the case where the split prism 5 has an excessively small deflection angle ε as shown in FIG. 4(e), because the luminous flux is projected onto the specimen surface 24 with no inclination, the movement of the image of the reference pattern 15 according to the vertical motion of the focusing assist apparatus is prevented, and the focusing assist apparatus becomes incapable of fulfilling its function. Therefore, it is necessary that the deflection angle ε of the split prism 5 used during a period of the focusing assist be adjusted as shown in FIGS. 4(b) to 4(d). In such cases, the conditional range is expressed by the expression (5). Additionally, it is necessary that the image of the light source 1 be incident to the objective lens pupil EP with the iris diaphragm 30 not obstructing the image of the light source 1. In such cases, the conditional range is expressed by the expression (4).

For adjustment of the iris diaphragm 30, a size of each unit, magnification, and a deflection angle of the split prism 5 should preferably be designed such that the condition is satisfied when the iris diaphragm is set at the maximum diaphragm diameter. The design should preferably be performed such that the condition is satisfied only by opening the iris diaphragm during a period of the focusing assist.

In a more preferable mode of the invention, the inserting and retracting mechanism (not shown) which inserts and retracts the split prism 5 is operated to forcedly set the diameter of the iris diaphragm 30 within a range where the conditions are satisfied when the split prism 5 is inserted.

The microscope having the focusing assist function according to the first embodiment of the invention is described above. The microscope of the invention is not limited to the first embodiment, but various modifications can freely be made without departing from the scope of the invention. For example, although the first embodiment is described with reference to the schematic diagram of the microscope in which the microscope optical system has an infinite optical system, the invention can also be applied to a finite optical system.

Figure 5:
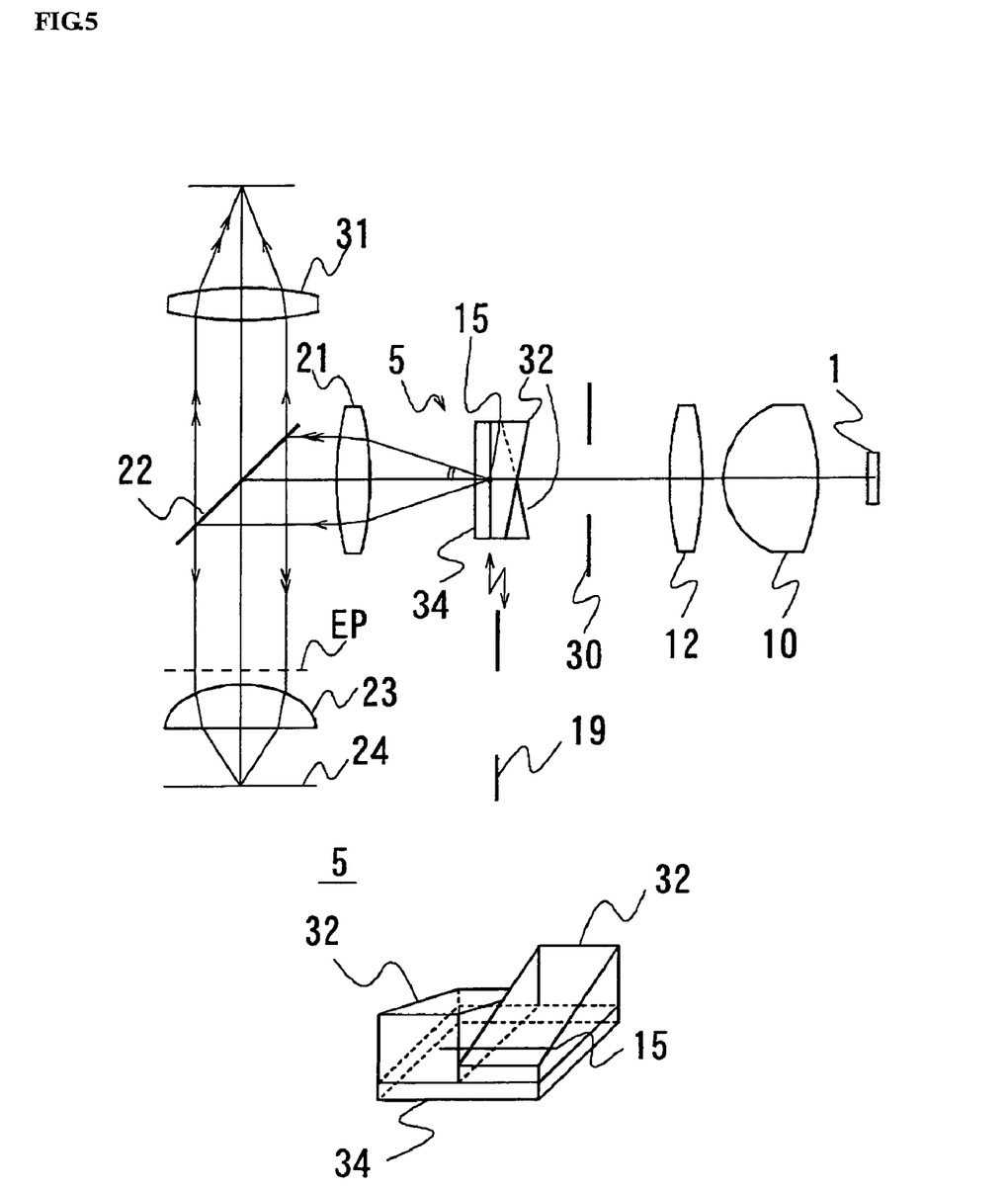
FIG. 5 is a view showing a configuration of the focusing assist apparatus of the first embodiment of the invention.

In the first embodiment, the split prism 5 is formed by the base prism 14 and the semicircular prism 16 having the apex angle which is twice as large as the base prism. Alternatively, for example, as shown in FIG. 5, a parallel plate 34 may be used instead of the base prism 14, two deflection prisms 32 having predetermined deflection angles may be bonded to the base prism such that luminous fluxes are inclined in opposite directions. The shapes of the parallel plate 34 and deflection prisms 32 may also be integrally molded by plastic molding.

A microscope provided with a focusing apparatus according to a second embodiment of the invention will be described below with reference to FIGS. 6(a)-6(c) and 7(a)-7(c) In the second embodiment of the invention, a suitable condition is set in a microscope in which an objective lens is selected from plural ones by a switching operation. A schematic configuration of the microscope provided with the focusing apparatus of the second embodiment is similar to that of the first embodiment, so that the description is omitted.

Figure 6:
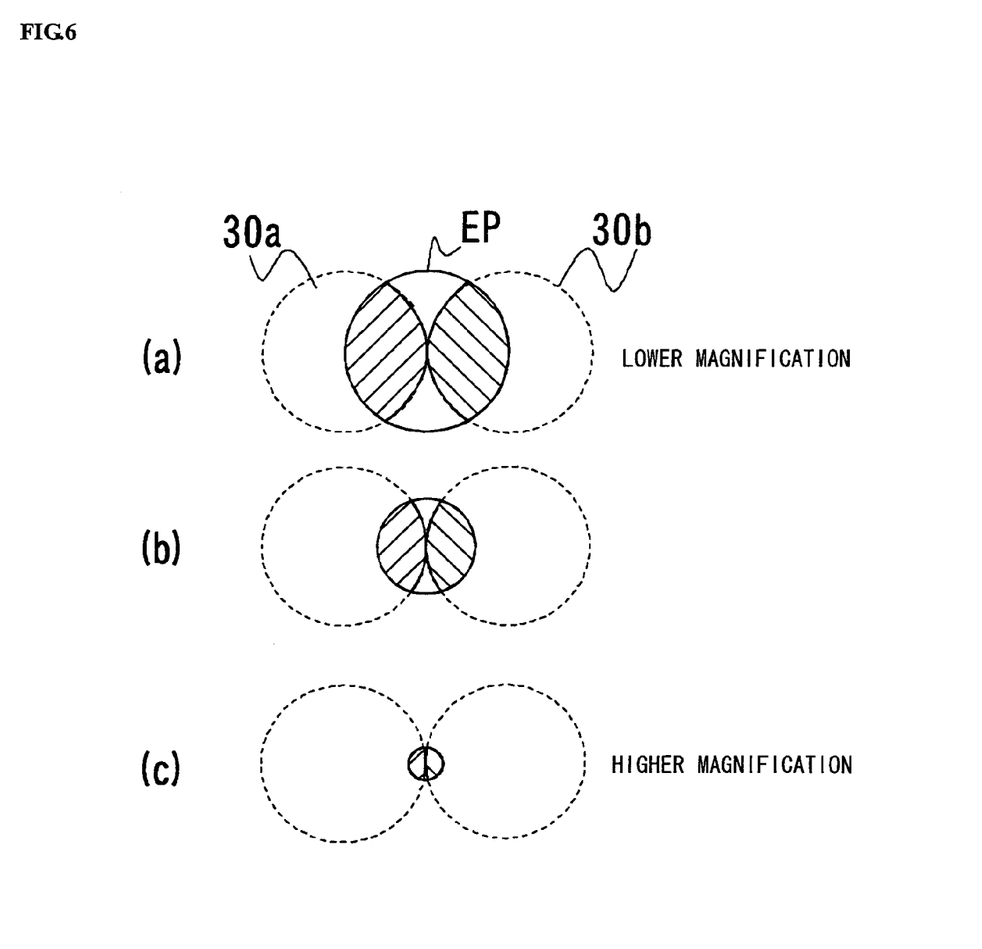

FIGS. 6(a)-6(c) show the case in which the expression (1) is satisfied. In FIGS. 6(a)-6(c), the maximum diameter of the iris diaphragm 30 is smaller than the image of the light source 1 formed at the position of the iris diaphragm 30, and the object is illuminated using part of the area of the light source 1 when the iris diaphragm 30 is opened. Generally objective lens pupils have different diameters, a diameter of an objective lens pupil tends to decrease with increasing magnification, and a diameter of an objective lens pupil tends to increase with decreasing magnification. In the second embodiment, as shown in FIGS. 6(a)-6(c), the condition is set such that the luminous flux 30a and the luminous flux 30b are just brought into contact with each other on the objective lens pupil.

Therefore, even if one of objective lenses which have different pupil diameters is used by a switching operation, good focusing assist can always be performed irrespective of a pupil diameter of the objective lens. In such cases, the conditional range is expressed by the expression (6). It can be seen that the conditional expression (6) is independent of a pupil diameter $\phi_0$ of the objective lens. In order to satisfy the condition, the iris diaphragm is used as the aperture of the microscope and the luminous fluxes are optimized while observing the objective lens pupil during a period of the focusing assist.

Figure 7:
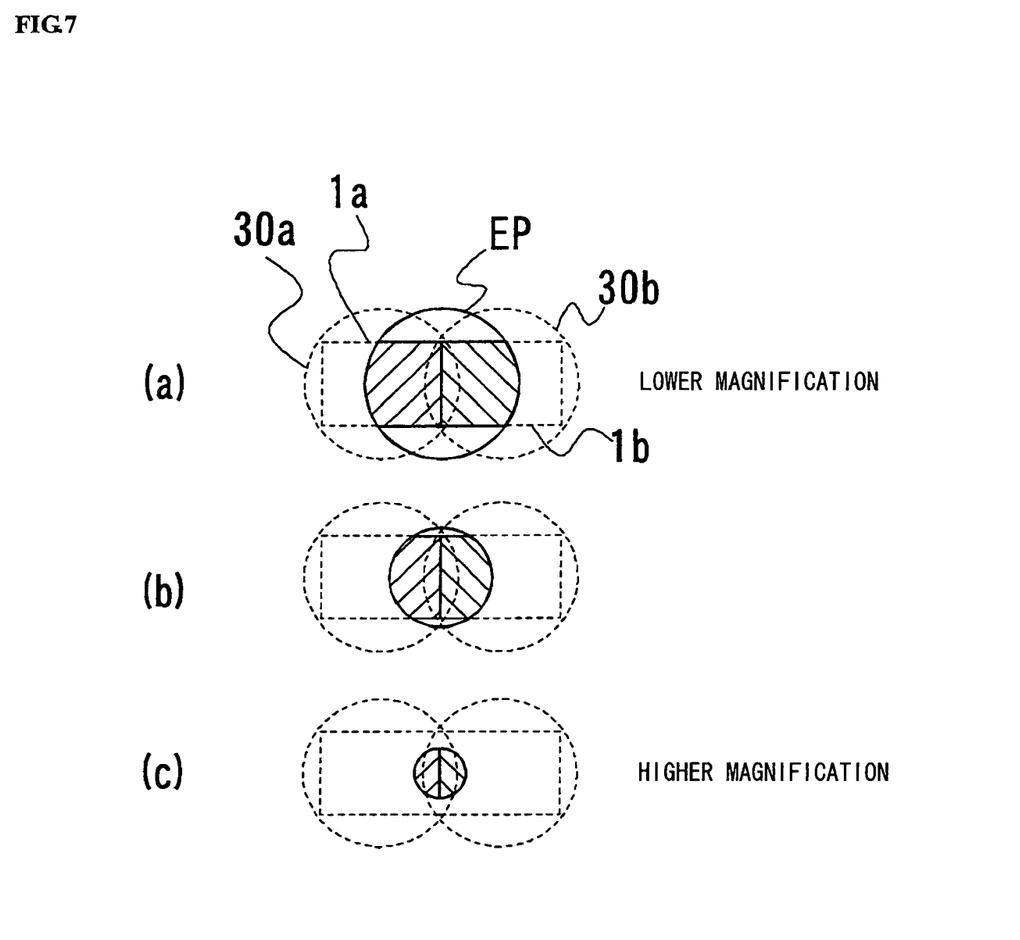

On the other hand, FIGS. 7(a)-7(c) show the case in which the expression (3) is satisfied. In FIGS. 7(a)-7(c), the maximum diameter of the iris diaphragm 30 is larger than the image of the light source 1 formed at the position of the iris diaphragm 30, and the object is illuminated using the whole area of the light source 1 when the iris diaphragm 30 is opened. As shown in FIGS. 7(a)-7(c), the deflection angle ε of the split prism 5 used during a period of the focusing assist is designed so as to satisfy the condition that the luminous flux 1a and the luminous flux 1b are just brought into contact with each other on the objective lens pupil. Therefore, even if one of objective lenses which have different pupil diameters is used by a switching operation, good focusing assist can always be performed irrespective of a pupil diameter of the objective lens.

In such cases, the conditional range is expressed by the expression (7). It can be seen that the conditional expression (7) is independent of a pupil diameter $\phi_0$ of the objective lens. Additionally, it is necessary that the image of the light source 1 be incident to the objective lens pupil EP with the iris diaphragm 30 not obstructing the image of the light source 1. In such cases, the conditional range is expressed by the expression (4).

For adjustment of the iris diaphragm 30, a size of each unit, magnification, and a deflection angle of the split prism 5 should preferably be designed such that the condition is satisfied when the iris diaphragm is set at the maximum diaphragm diameter. The design should preferably be performed such that the condition is satisfied only by opening the iris diaphragm during a period of the focusing assist.

In a more preferable mode of the invention, the inserting and retracting mechanism (not shown) which inserts and retracts the split prism is operated to forcedly set a diameter of the iris diaphragm 30 within a range where the conditions are satisfied when the split prism is inserted.

The invention claimed is:

1. A microscope provided with a focusing assist apparatus, comprising:
   a light source;
   a first lens group;
   a diameter-variable diaphragm which is disposed at a position which is conjugate with said light source while said first lens group is interposed therebetween;
   an optical path branching member which is illuminated with a luminous flux restricted by said diameter-variable diaphragm, said optical path branching member having a focusing indicator and forming two luminous fluxes, the luminous fluxes being inclined by predetermined angles from an optical axis;
   a second lens group; and
   an objective lens,
   wherein said diameter-variable diaphragm is disposed at a position which is conjugate with a pupil plane of said objective lens while said second lens group is interposed therebetween,
   said focusing indicator of said optical path branching member is disposed at a position which is conjugate with an observed surface by said second lens group and said objective lens,
   said optical path branching member is insertable into and is retractable from a microscope optical path,
   a diameter φ of said diameter-variable diaphragm is set at a predetermined value suitable to focusing assist when said optical path branching member is inserted into the microscope optical path, and
   the setting suitable to the focusing assist is given by satisfying simultaneously the following conditional expressions (1) and (2),

[Formula 1]

$$\beta_1 a \geq \phi_M \tag{1}$$

$$2L\tan\left(\varepsilon - \tan^{-1}\frac{\phi_0}{2L\beta_2}\right) < \phi < 2L\tan\left(\varepsilon + \tan^{-1}\frac{\phi_0}{2L\beta_2}\right) \tag{2}$$

where $\beta_1$ is magnification of an image formed at a position of said diameter-variable diaphragm by said light source through said first lens group, a is a size of said light source, $\phi_M$ is a maximum diameter of said diameter-variable diaphragm, $\varepsilon$ is an inclination of a luminous flux given by said optical path branching member, L is a distance between said diameter-variable diaphragm and said focusing indicator, $\phi_0$ is a pupil diameter of said objective lens, and $\beta_2$ is magnification of an image of said diameter-variable diaphragm formed at a position of the pupil plane of said objective lens through said second lens group.

2. The microscope according to claim 1, wherein the following conditional expression (6) is satisfied, $$\phi = 2L \tan \varepsilon \tag{6}$$

3. A microscope provided with a focusing assist apparatus, comprising:
   a light source;
   a first lens group;
   a diameter-variable diaphragm which is disposed at a position which is conjugate with said light source while said first lens group is interposed therebetween;
   an optical path branching member which is illuminated with a luminous flux restricted by said diameter-variable diaphragm, said optical path branching member having a focusing indicator and forming two luminous fluxes, the luminous fluxes being inclined by predetermined angles from an optical axis;
   a second lens group; and
   an objective lens,
   wherein said diameter-variable diaphragm is disposed at a position which is conjugate with a pupil plane of said objective lens while said second lens group is interposed therebetween,
   said focusing indicator of said optical path branching member is disposed at a position which is conjugate with an observed surface by said second lens group and said objective lens,
   said optical path branching member can be inserted into and retracted from a microscope optical path,
   a diameter φ of said diameter-variable diaphragm is set at a predetermined value suitable to focusing assist when said optical path branching member is inserted into the microscope optical path, and
   the setting suitable to the focusing assist is given by satisfying simultaneously the following conditional expressions (3), (4), and (5),

[Formula 2]

$$\beta_1 a < \phi_M \tag{3}$$

$$\beta_1 a < \phi \leq \phi_M \tag{4}$$

$$2L\tan\left(\varepsilon - \tan^{-1}\frac{\phi_0}{2L\beta_2}\right) < \beta_1 a < 2L\tan\left(\varepsilon + \tan^{-1}\frac{\phi_0}{2L\beta_2}\right) \tag{5}$$

where $\beta_1$ is magnification of an image formed at a position of said diameter-variable diaphragm by said light source through said first lens group, a is a size of said light source, φ is a diameter of said diameter-variable diaphragm, $\phi_M$ is a maximum diameter of said diameter-variable diaphragm, is an inclination of a luminous flux given by said optical path branching member, L is a distance between said diameter-variable diaphragm and said focusing indicator, $\phi_0$ is a pupil diameter of said objective lens, and $\beta_2$ is magnification of an image of said diameter-variable diaphragm formed at a position of the pupil plane of said objective lens through said second lens group.

4. The microscope according to claim 3, wherein the following conditional expression (7) is satisfied, $$\beta_1 a = 2L \tan \varepsilon \tag{7}$$

* * * * *